United States Patent Office 3,140,821
Patented July 14, 1964

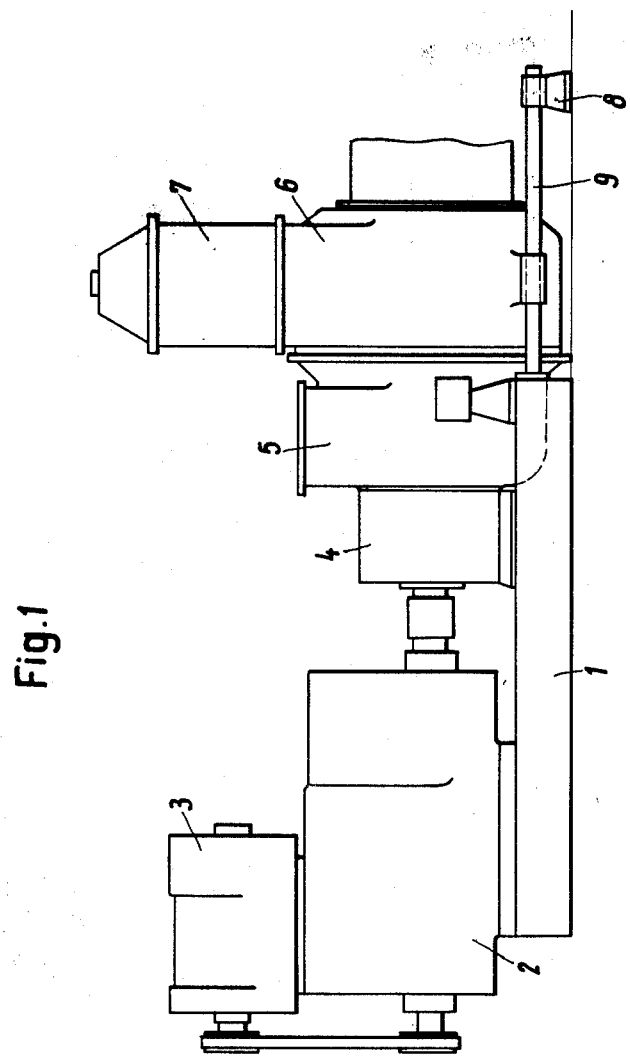

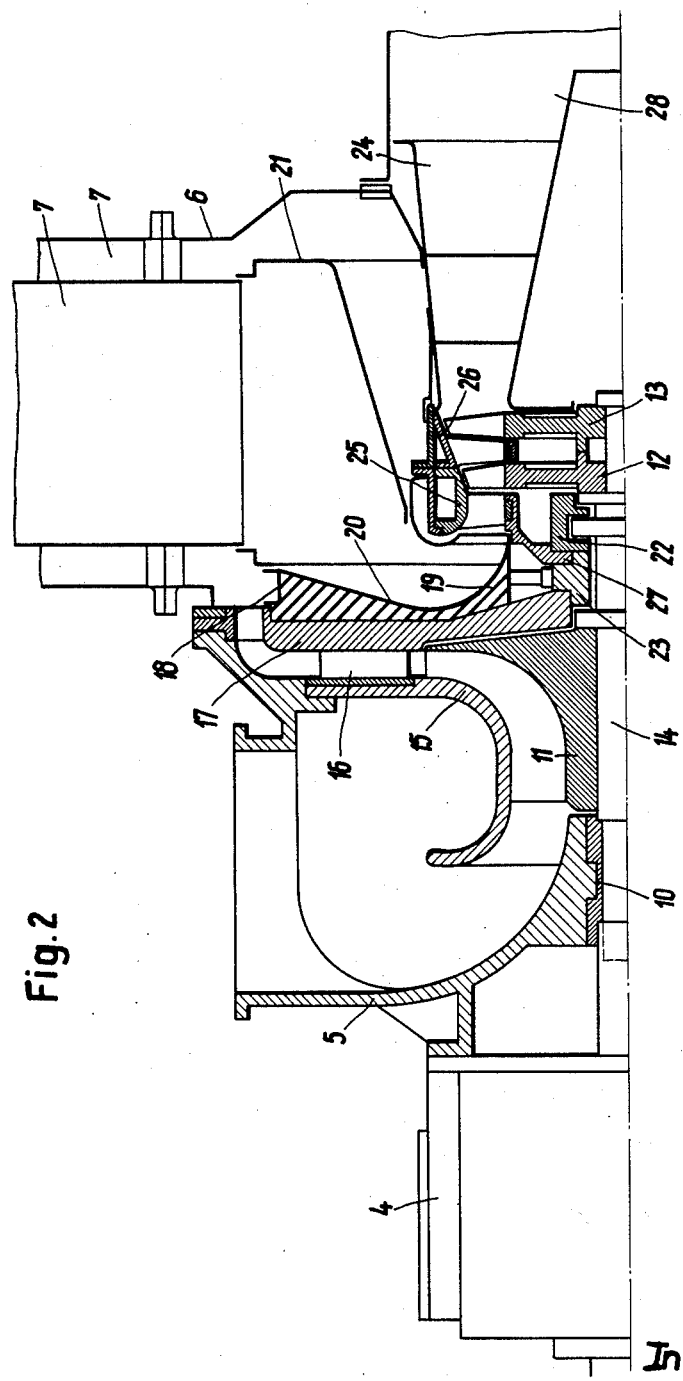

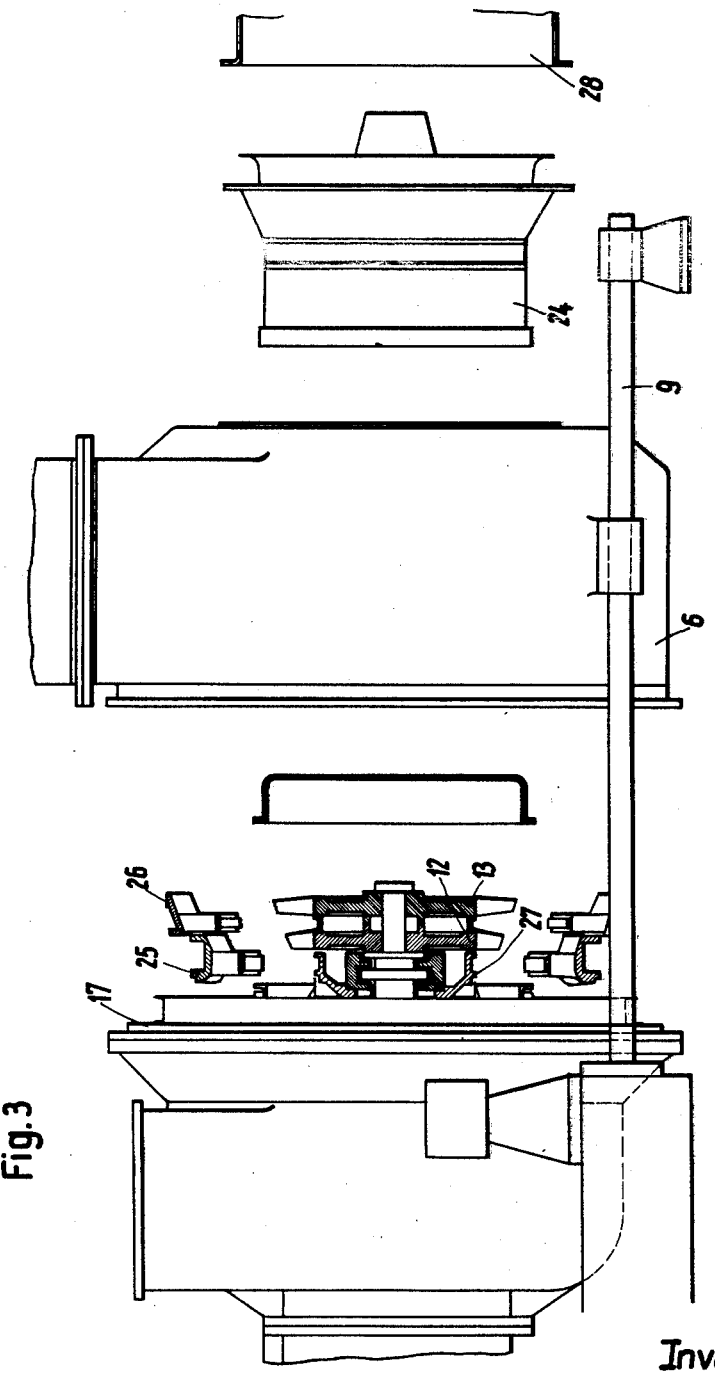

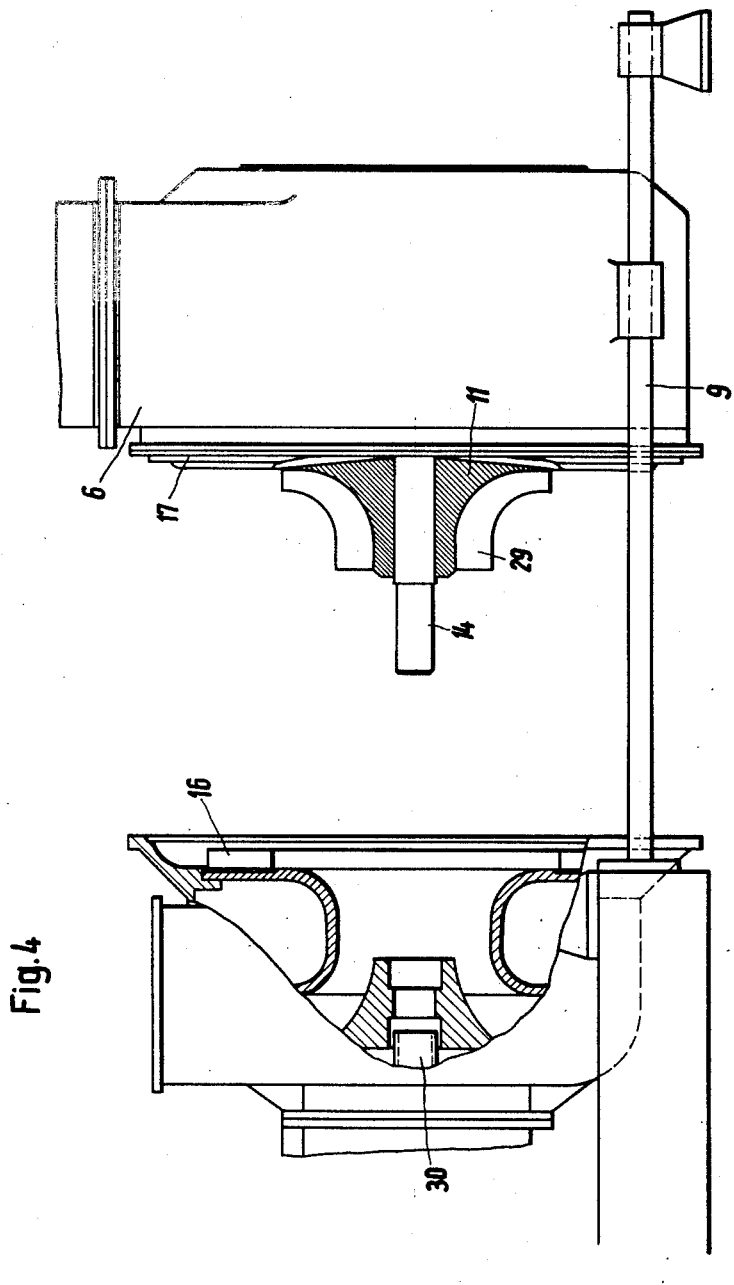

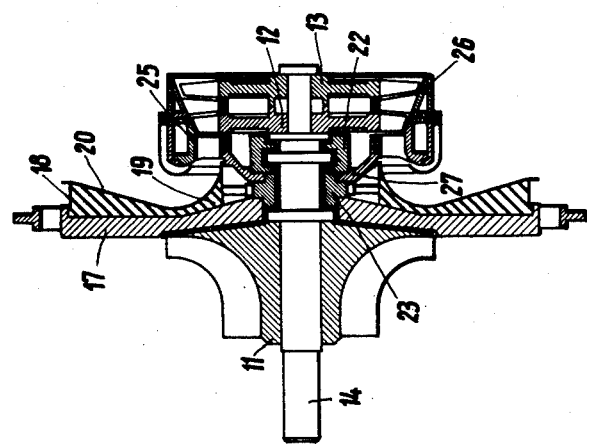

3,140,821
GAS TURBINE PLANT
Horst Weckwert, Oberstedten, Taunus, and Georg Oberländer and Günther Lange, Oberursel, Taunus, Germany, assignors to Klockner-Humboldt-Deutz Aktiengesellschaft, Cologne-Deutz, Germany
Filed Feb. 5, 1962, Ser. No. 172,838
5 Claims. (Cl. 230—116)

The present invention concerns a gas turbine plant in which the turbine coaxially drives a turbine compressor and in which the runners or rotors of the two machines have a common shaft.

It is an object of the present invention so to design such plant that it can not only be assembled easily but that particularly after the plant has been put into operation, all functionally important parts will easily be accessible whenever an inspection or exchange of parts will be deemed necessary.

It is also an object of the present invention to provide a gas turbine plant as set forth in the preceding paragraph, which is simple and relatively inexpensive in construction, operation and servicing.

These and other objects and advantages of the invention will appear more clearly from the following specification in connection with the accompanying drawings, in which:

FIG. 1 diagrammatically illustrates a side view of the entire gas turbine plant comprising a two-stage axial turbine and a radial compressor coaxially driven by said turbine.

FIG. 2 illustrates on a larger scale than FIG. 1 a longitudinal section through the most important parts of the compressor and turbine.

FIG. 3 illustrates the gas turbine plant disassembled to the extent to which it is necessary for an inspection of the turbine runners.

FIG. 4 illustrates the disassembly operation required for inspecting the compressor part of the rotor.

FIG. 5 shows what is considered to be the core of the gas turbine plant which core comprises a shaft, the compressor rotor and turbine runners connected to said shaft, a bearing betwen said rotor and runners, and a supporting wall for said bearing.

General Arrangement

The gas turbine plant according to the present invention is characterized primarily by the following features:

One of the bearings for the shaft common to the rotor of the compressor and the runner of the turbines is in a manner known per se arranged between the compressor and the turbine, while the housing for this bearing is mounted in a wall clamped between the compressor housing and the turbine housing. A further feature of the arrangement according to the present invention is seen in that, when the plant is opened up on the side of the compressor adjacent the clamped-in wall, the rotor is movable out of the compressor housing, or if the plant is opened up on the turbine side adjacent said wall, the rotor is movable out of the turbine housing. The arrangement according to the present invention thus comprises principally three construction groups. One of these groups is represented by the compressor housing, the second group is formed by the wall clamped between said housing and the turbine housing, which wall supports the complete rotor, and the third group is formed by the turbine housing with the gas collector and other stationary parts.

It is, of course, self-understood that with this design, other shaft bearings labyrinth and other devices cooperating with the shaft will be so designed that the moving out of the rotor shaft after the plant has ben opened up will not be impeded by these devices. The same also applies to the guiding apparatuses or distributors in the turbine and/or compressor. These parts are, in conformity with the present invention, to be centered and supported in such a way that they can be removed together with the rotor. Also the gas collector or gas accumulator must be so designed that it will not impede the moving out of the construction groups.

In conformity with a further development of the invention, it is suggested to connect the closing wall on the compressor side for the gas collector for the turbine by means of an annular sheet metal member to the rotor supporting wall which is clamped between the turbine housing and the compressor housing, while the remaining parts of the collector are so to be designed that when assembling the plant, it will rest in a gas-tight manner against its closing wall on the compressor side.

According to a further feature of the invention, between the housing of the intermediate rotor bearing and the wall supporting said bearing there is clamped a distributor star for blocking air, cooling air and lubricant, said distributor star having the shape of an easily machinable disc.

When larger gas turbine plants built up in conformity with the present invention are involved, it is suggested in conformity with a further development of the invention, for purposes of saving a crane during an inspection or a repair, to provide a special device which after opening up the plant will make possible a displacement of the compressor housing or of the turbine housing in axial direction thereof. Such devices are known per se and may be of any suitable design but must not or not materially impede access to the parts to be inspected. Such devices may consist for instance in conformity with a further development of the invention in arms or beams which are arranged preferably near the foundation and parallel to the longitudinal axis of the plant and are either stationarily arranged or may be removable after the plant has been assembled.

Structural Arrangement

Referring now to the drawings in detail and FIG. 1 thereof in particular, the gas turbine plant shown therein comprises a fundation 1 having mounted thereon a current producer 2 with exciter 3, a stepdown transmission 4 and the entrance housing 5 of the radial compressor of the turbine plant. Flanged to the compressor housing 5 is the turbine housing 6 with combustion chamber 7 mounted thereon. For purposes of facilitating disassembly, the turbine housing 6 is axially displaceably guided by the two arms or beams 9 which on one hand rest on the foundation 1 and on the other hand through the intervention of supports 8 rest on the ground.

As will be obvious from FIG. 2, the driving part proper of the plant is composed of a plurality of installation groups. One of these groups is represented by the stepdown transmission 4. Another installation group is formed by the compressor entrance housing 5 with the outer bearing 10, shaft 14 common to the compressor rotor 11 and the two turbine runners 12 and 13, the compressor inlet return 15, and the compressor outlet guiding apparatus 16. The further installation group which is shown separately in FIG. 5 comprises a wall 17 clamped between the compressor entrance housing 5 and the turbine housing 6 and closing the compressor housing on that side which is adjacent the turbine. Connected to wall 17 at the turbine facing side thereof by means of an annular sheet metal member 18 is a face wall 20 of the gas collector 21 which at the compressor facing side carries a heat screen 19. In said wall 17, is mounted the housing of the second turbine bearing 22 arranged between the compressor rotor 11 and the turbine runners 12 and 13. To this installation group there is further to be counted a distributor star 23 clamped between wall 17 and the housing for bearing 22. This distributor star 23 is intended for blocking air, cooling air and lubricants. The said installation group also comprises guide rings 25 and 26 composed of segments for the first and second turbine stage respectively. The last installation group is formed by the axially displaceable turbine housing 6 with combustion chamber 7 mounted thereon, gas collector 21, and gas outlet diffuser 24.

FIG. 3 illustrates how an inspection of the turbine runners may be conducted. The plant is opened up directly adjacent wall 17 (see also the other figures), and the turbine housing 6 is subsequently displaced along the arms 9 to such an extent that that part of the rotor which is adjacent the turbine will be accessible. A crane is not required for this purpose. The only parts which have to be unscrewed and put aside are the waste gas diffuser 24 and the possibly connected waste gas conduit 28. After disassembly of the two turbine guide wheel rings 25 and 26, which, as mentioned above consist of segments and the supports 27 of which are connected by means of the blades of the guide wheel ring 25 to a separate supporting ring on the turbine wheel bearing, the runners 12 and 13 will be open for inspection, cleaning and replacement if necessary.

If an inspection of the compressor parts is intended, the opening up is in conformity with FIG. 4 effected on the side adjacent the compressor directly adjacent wall 17. Wall 17 remains connected to the turbine housing 6 and will be together with the latter displaced on arms 9 after the opening up of the plant has been effected. During the displacement, the rotor shaft 14 together with the compressor rotor 11 and the rotor 29 is withdrawn from the compressor entrance housing and will thus be open for inspection, cleaning and repair if necessary. At the same time, also the outlet guiding apparatus 16 of the compressor will be open inasmuch as its wall adjacent the turbine is formed by disc 17 which when assembling the plant merely rests against the guide members or baffle plates. The coupling between rotor shaft 14 and transmission shaft is effected by a sleeve 30 which in a manner known per se is at both ends guided in teeth on the shaft ends.

It is self-understood that all parts of the turbine plant are so designed that the above mentioned disassembling movements will be possible. Thus, for instance, that end of the rotor shaft which is adjacent the compressor has to be so designed that the teeth can be pulled through the bearing.

It is, of course, to be understood that the present invention is, by no means, limited to the particular construction shown in the drawings but also comprises any modifications within the scope of the appended claims.

What we claim is:

1. A gas turbine plant which comprises in combination: a turbine having a runner and a turbine housing, a turbo-compressor having a rotor and a compressor housing and being coaxially arranged with regard to said turbine and being drivingly connected thereto, the driving connection between said turbine and said rotor including a shaft common to said runner and said rotor, bearing means for journalling said shaft, said bearing means including a single bearing interposed between said compressor and said turbine and including a bearing housing, a disc-like wall member mounted between said compressor housing and said turbine housing, means fixedly supportingly connecting said bearing to said wall member, said wall member forming an end wall for each housing, each of said housings being apertured at the end facing said wall with a central aperture larger than the rotor in the respective said housing and each housing engaging said wall member in an annular region adjacent the periphery of the wall member and being detachably connected to the wall member so that opening up of said plant along that side of said wall member which faces said compressor by disconnecting the compressor housing from said wall member will permit withdrawal of said compressor housing from about the compressor rotor, while opening up of said plant along that side of said wall member which faces said turbine by disconnecting the turbine housing from said wall member will permit withdrawal of said turbine housing from about the turbine rotor.

2. A gas turbine plant according to claim 1 wherein said plant also includes a gas collector housing for said turbine, said gas collector housing having an end wall facing said compressor, said end wall being detachably connected to said wall member in axially spaced relationship thereto, and means interposed between said wall member and said end wall for maintaining said spaced relationship in assembled condition of said plant.

3. A gas turbine plant according to claim 1 wherein the combination includes a disc-shaped distributor means clamped in between said wall member and said bearing housing for conveying blocking air, cooling air and lubricant.

4. A gas turbine plant according to claim 1 wherein guiding bar means are provided extending in axial direction along opposite sides of said housings and slidingly supporting at least one of said housings to facilitate the displacement of said one housing or of said one housing together with said wall member for inspection, repair and exchange of parts of said plant.

5. An arrangement according to claim 4, in which said guiding bar means are detachably connected to said plant to permit removal thereof from said plant after said plant has been completely assembled.

References Cited in the file of this patent

UNITED STATES PATENTS

| | | |
|---|---|---|
| 2,541,850 | Wade | Feb. 13, 1951 |
| 2,577,134 | Land | Dec. 4, 1951 |
| 2,881,972 | Feilden | Apr. 14, 1959 |
| 2,973,135 | Greenwald | Feb. 28, 1961 |

FOREIGN PATENTS

| | | |
|---|---|---|
| 652,423 | France | Mar. 8, 1929 |